Patented Sept. 16, 1952

2,610,953

UNITED STATES PATENT OFFICE 2,610,953

POLYVINYL PHOSPHORIC ACID ESTERS OF CELLULOSE AND PROCESSES FOR MAKING THE SAME

George C. Daul and John D. Reid, New Orleans, La., assignors to the United States of America as represented by the Secretary of Agriculture No Drawing. Application April 25, 1950, Serial No. 158,054

9 Claims. (Cl. 260—17.4)

(Granted under the act of March 3, 1883, as amended April 30, 1928; 370 O. G. 757)

The invention herein described may be manufactured and used by or for the Government of the United States of America for governmental purposes throughout the world, without the payment to us of any royalty thereon.

This invention relates to novel derivatives of cellulose. It particularly relates to polyvinyl phosphoric acid esters of cellulose having valuable ion-exchange properties.

Phosphorylated cotton cellulose has been prepared in the past by a process involving the phosphorylation of cotton cloth or linters, and its properties of ion-exchange are known.

According to our invention, we have discovered that phosphorylated cellulose possessing a very high ion-exchange capacity may be prepared by reaction between a cellulosic material such as cotton cloth, cotton linters, alpha cellulose, and the like with polyvinyl phosphoric acid. The phosphorylated cellulose thus produced possesses an ion-exchange capacity in excess of previous phosphorylated cellulose, because of its greatly increased content of free phosphoric acid groups.

The polyvinyl phosphoric acid, sometimes termed polyvinyl phosphate, which we employ in our invention, may be prepared by reaction between polyvinyl alcohol and a phosphorylating agent such as phosphorus pentoxide, phosphoric acid, and urea phosphate. A particularly advantageous method for its preparation involving the use of urea phosphate is described and claimed in our co-pending application, Serial No. 158,053 filed April 25, 1950.

The polyvinyl phosphoric acid, or preferably, its urea or ammonium salt, is caused to react with cellulose, particularly cotton, by employing a solution of the reagent which is added to the cotton, preferably by padding. The reaction mixture thus produced comprising cotton and the polyvinyl phosphate is then heated to a temperature within the range of 130° C. to 160° C. for a period of about 15 minutes. The time necessary to complete the reaction varies with the temperature employed. For example, at 130° C. the reaction proceeds relatively slowly, while at the temperatures in the upper limits some pyrolysis occurs unless care is taken to avoid momentary overheating. In general, the time required will be within the range of 30 minutes at the lower temperatures to 10 minutes at temperatures near 160° C.

We have discovered, moreover, that when times are employed in excess of those specified, and at lower temperatures, polyvinyl phosphoric acid will polymerize on the phosphorylated cotton. We believe this discovery to be of unique significance since it permits the deposition of a layer of polymerized polyvinyl phosphoric acid which has a high capacity in itself for ion-exchange. Thus it is possible to first react polyvinyl phosphate with cotton cloth to produce the cellulose ester, then using other conditions, polymerize a surface layer of polyvinyl phosphate on the cloth, thereby giving a product with greater ion-exchange capacity than possible with either single treatment.

In carrying out the process of our invention, we prefer to add a small amount of urea or other degradation preventative agent to the reaction mixture. The polyvinyl phosphoric acid esters of cellulose probably possess some cross linkage between phosphoric acid groups of the cellulose. Nevertheless there are a large number of free phosphoric acid groups still available after reaction, and this structural characteristic of the product renders it valuable for ion-exchange and other purposes which will be apparent to those skilled in the art.

The nature of the compound(s) formed is such that the exact chemical structure would be practically impossible to identify, however, an example of a general compound would be:

$$(-CH-CH_2-CHOH-CH_2-CH-CH_2-)_y$$
$$\text{(Cellulose unit)}_x-O-\overset{O}{\underset{O}{P}}-OH \qquad HO-\overset{O}{\underset{O}{P}}-OH$$

The $x$ and $y$ are integers which may vary according to the number of positions reacted and the length of the vinyl chain.

The following examples illustrate the invention:

Example 1

Three hundred grams of orthophosphoric acid, in 85% solution, and one hundred seventy-five grams of urea were mixed and warmed to solution. To this was added 100 grams of low viscosity polyvinyl alcohol dissolved in 300 ml. of water. These materials were mixed to a smooth paste and placed in a pan. It was heated in an oven with air circulation at 110° C. with occasional stirring for three hours to evaporate excess water, then heated at 150° C. for 15 minutes. The product was dissolved in water, precipitated in acetone and dried under vacuum. A portion was then ground and purified for analysis by extraction with acetone in a Soxhlet extractor for eight hours. The product has a phosphorus content of 19.6% and a nitrogen content of 9.8%.

For a substitution of 3 acid groups per 4 vinyl groups, the mono ammonium salt would have a phosphorus content of 19.9% and a nitrogen content of 9.0%.

This example illustrates the preparation of the material used to react with or on cellulose. Copending application Serial No. 158,053 filed April 25, 1950, contains a fuller disclosure. In Serial No. 158,053 tests are described showing that substantially all of the phosphorus was singly bound to the polyvinyl alcohol chain.

*Example 2*

Thirty grams of the crude product of Example 1 and 30 grams of urea (to prevent degradation) were dissolved in 70 ml. of water and padded on cotton cloth to a takeup of 100% liquid to weight of cloth. The cloth was then air-dried and baked at 140° C. for 15 minutes, washed thoroughly with water containing 5% ammonium hydroxide, then with hot distilled water. The cloth product had increased in weight 22.4% and contained 3.87% phosphorus. Part was converted to the free acid by steeping with dilute hydrochloric acid. This form had a total cation exchange capacity of 2100 m. e./kg. (based on sodium removed from 0.1 N sodium hydroxide solution. This method is described in Analytical Chemistry 21, 87, (1949).

*Example 3*

Part of the cloth product of Example 2 was retreated in the same manner. The phosphorus content increased to 6.17%. Converted to the free acid, the cation exchange capacity was 2615 m. e./kg.

*Example 4*

Part of the cloth product of Example 2 was soaked in a 30% solution of the mono-ammonium salt of polyvinyl phosphate and padded free of excess to about 100% takeup. The cloth was air dried, and then cured at 130° C. for one hour to polymerize a surface coating of polyvinyl phosphate on the phosphorylated cloth. Increase in weight was 13.5%. Total cation exchange capacity was now 2600 m. e./kg.

*Example 5*

A solution such as used in Example 2 was padded on cotton, nylon, and cellulose acetate tapes. Glass tape was soaked and drained of excess to approximately the same pick-up as the other materials. The tapes were then cured at 150° C. for fifteen minutes. After washing and drying, the cellulose acetate had gained no weight, the nylon gained only 0.7%, the glass 0.9%, and the cotton 7.8%. This indicated a reaction between the cotton and polyvinyl phosphate.

*Example 6*

The experiment in Example 5 was repeated except the curing time was increased to one hour. In this case, after washing and drying, the cotton had gained 12.0%, nylon 11.0%, cellulose acetate 13.9%, and the glass 10.44%. This indicated that polyvinyl phosphate will polymerize on substances other than cellulose at longer periods of curing than that required for reaction with cellulose.

*Example 7*

A piece of cotton cloth was padded with a solution such as used in Example 2 to about 100% takeup of liquid based on the weight of the cloth and then cured in an oven at 110° C. for three hours. This temperature is below that required for reaction with cellulose (ca. 140° C.) but sufficient to polymerize polyvinyl phosphate on the surface of the cloth. Increase in weight after thorough washing was 20.6%. Phosphorus content was 3.2%. Total cation exchange capacity was 1386 m. e./kg. The ammonium salt and free acid forms of the above cloth were flameproof and glowproof.

Having thus described our invention, we claim:

1. A process for preparing a polyvinyl phosphoric acid ester of cellulose, having ion-exchange properties, which comprises reacting by heating an aqueous solution of a compound of the group consisting of the acid, polyvinyl phosphoric acid, being a phosphoric acid ester of polyvinyl alcohol, and its ammonium salt, with cellulose, at a temperature and for a time sufficient to cause said reaction but not so high or so long as to cause substantial charring, in the temperature range 130° C. to 160° C. for about 10 to 30 minutes.

2. A process for preparing a polyvinyl phosphoric acid ester of cellulose, having ion-exchange properties, which comprises reacting by heating an aqueous solution of a compound of the group consisting of polyvinyl phosphoric acid, being a phosphoric acid ester of polyvinyl alcohol, and its ammonium salt, with cellulose, at a temperature and for a time sufficient to cause said reaction but not so high or so long as to cause substantial charring, in the temperature range 130° C. to 160° C. for about 10 to 30 minutes, the reaction being carried out with urea in contact with the reacting substances.

3. A process for preparing a polyvinyl phosphoric acid ester of cellulose, having ion-exchange properties, which comprises reacting by heating an aqueous solution of a compound of the group consisting of polyvinyl phosphoric acid, being an orthophosphoric acid ester of polyvinyl alcohol, which ester has free phosphoric acid groups, and its ammonium salt, with cellulose, at a temperature and for a time sufficient to cause said reaction but not so high or so long as to cause substantial charring, at a temperature in the range 130° C. to 160° C. for about 10 to 30 minutes, thereafter coating said reaction product with an aqueous solution of a substance taken from the said group and heating for a time sufficient to polymerize said coating substance.

4. An ion-active substance comprising a cellulose ester having phosphoric acid groups available for ion exchange, being an ester of cellulose with a polyvinyl alcohol ester of orthophosphoric acid, the latter ester being the reaction product of polyvinyl alcohol, orthophosphoric acid and urea phosphate, which reaction product possesses phosphoric acid groups available for esterification of the cellulose.

5. A substance of the group consisting of the substance defined in claim 4 and the ammonium salt thereof.

6. A cation exchange material comprising an ester of cellulose which ester has phosphoric acid groups available for ion exchange, being an ester of cellulose with a polyvinyl alcohol ester of orthophosphoric acid, the latter ester having phosphoric acid groups available for reaction with the cellulose being the reaction product of polyvinyl alcohol and orthophosphoric acid, said cellulose ester having a polymerized surface coating of said orthophorphoric acid ester of polyvinyl alcohol which coating has phosphoric acid groups available for ion exchange.

7. A process for preparing polyvinyl phosphoric acid esters of cellulose comprising reacting an aqueous solution of a compound of the group consisting of phosphoric acid ester of polyvinyl alcohol and its ammonium salt with cellulose at a temperature in the range of 130° C. to 160° C. for a time sufficient to cause reaction of the compound with the cellulose without substantial charring.

8. The process of claim 7 in which said reaction is carried out with urea in contact with the reacting substances.

9. The method which comprises heating the reaction product of claim 7 in contact with an aqueous solution of a substance of the group consisting of phosphoric acid ester of polyvinyl alcohol and its ammonium salt for a time sufficient to polymerize said substance as a coating on said reaction product and at a temperature below that at which charring takes place.

GEORGE C. DAUL.
JOHN D. REID.

REFERENCES CITED

The following references are of record in the file of this patent:

UNITED STATES PATENTS

| Number | Name | Date |
|---|---|---|
| 1,835,619 | Walsh | Dec. 8, 1931 |
| 2,155,591 | Garvey | Apr. 25, 1939 |
| 2,265,585 | Urbain et al. | Dec. 9, 1941 |

FOREIGN PATENTS

| Number | Country | Date |
|---|---|---|
| 557,389 | Great Britain | Nov. 18, 1943 |